United States Patent Office 2,706,700
Patented Apr. 19, 1955

2,706,700

COMPOSITION OF MATTER FOR THE TREATMENT OF RICE AND OTHER SIMILAR SMALL GRAINS

Ward A. Graham, Kansas City, Mo., assignor to Douglas Chemical and Supply Company, North Kansas City, Mo., a corporation of Missouri No Drawing. Application October 22, 1951,
Serial No. 252,568

2 Claims. (Cl. 167—24)

This invention relates to a composition of matter and more particularly to an insecticide for the treatment of rice, wheat, corn, barley, oats and other similar small grains.

It is a well known fact to those persons connected with the small grain industry, from the farmer to the consumer, that rice, wheat, corn, barley, oats, as well as other grains, are subject to insect infestation both in the field and in storage. This infestation by insects costs the industry an untold number of dollars each year. The farmer's yield is reduced and a percentage of stored rice, wheat, corn, barley, oats and grains is lost to the parasitical insect. Despite vigorous control methods in use at the present time, rice handlers and rice consumers are still faced with the unpleasant possibility of finding their rice and grains ruined partially or completely by insects.

The requirements for an effective insecticide to be used in rice, wheat, corn, barley, oats and other small grain spraying are numerous and exacting. The insecticide must be relatively non-toxic to all persons coming into contact with it, from the individual who produces it, to the ultimate consumer. The insecticide must not injure, discolor, or impair saleability of the grains in any way. The insecticide must kill all forms of rice infesting insects as well as other grain insects and prevent any insect reproduction. The insecticide must have residual properties capable of protecting the rice and grains for a sufficient length of time. The insecticide must not affect subsequent processing of the rice. The insecticide must be at no greater maximum strength than ten parts per million when the rice is finally consumed in one edible form or another. This latter requirement is one stipulated by the Pure Food and Drug Administration. The insecticide must be applicable within economically feasible limits.

From the foregoing, one of the important objects of the present invention is the creation of a grain insecticide that will be relatively non-toxic to those who originally apply the material to those who consume the rice.

Another important object of this invention is the preparation of an insecticide that will neither injure, discolor, nor impair the saleability of the rice and other grains in any way.

Another important object of this invention is the preparation of an insecticide that will kill all forms of rice infesting insects as well as other insects infesting other similar types of grains and prevent any insect reproduction.

A still further important object of this invention is the preparation of an insecticide that has residual properties sufficient to meet the most rigid requirements.

A still further important object of this invention is the preparation of an insecticide that will not in any way inhibit subsequent processing of the rice or other treated grains.

A yet further important object of the present invention is the preparation of an insecticide that is economically feasible to apply in every respect both as to cost and ease of application.

A still further important object of the present invention is the preparation of an insecticide that will be within all the requirements stipulated by the Pure Food and Drug Administration.

Many additional objects relating particularly to details of preparation of the composition of matter which render the aforesaid objects possible will be made clear or become apparent during the course of the following specification.

The insect to be discussed in this case, but only by way of example and not by limitation, is the rice weevil or *Sitophilus oryzae* L. This insect bores a hole into the rice kernel and deposits an egg therein. After depositing the egg, the adult insect then seals the hole over with a secreted gelatinous material. It is notable that one adult female rice weevil can lay and deposit as many as 300 to 400 eggs in a normal life span of four or five months. The egg subsequently hatches from its deposited location and the resulting larva and pupa remain within the kernel, eating out the interior, until finally the adult weevil emerges and the process is repeated. As is apparent, control of such an insect is difficult when it develops in this manner, but there are three possible methods of proceeding. First, the insect must be prevented from laying the egg. Second, the egg must be destroyed before it hatches or before the adult weevil emerges from the rice kernel. Third, the weevil must be killed as soon as possible after emergence. The first control measure is usually attempted by field spraying, the second and third by fumigation of the grain in the bins or storage containers. The latter two methods are the ones with which this invention is most concerned.

According to the present invention, improved insecticidal mixtures are provided which comprise as a major toxic insecticide having the ingredients pyrethrins, piperonyl butoxide, and kerosene or naphtha. The optimum of effectiveness for each of the three ingredients is 0.64%, 6.40% and 4.96% respectively. However, each of the three ingredients may vary and give effective and satisfactory results from 0.32–1.6%, 3.20–16% and 2.48–12.4% respectively. It is of importance to note however, that each of the three previously mentioned ingredients will vary proportionately one to the other. For example, if 3.2% of piperonyl butoxide is used, then 0.32% of pyrethrins will be adopted which is one-tenth that of the former and 2.48% of the kerosene or naphtha will be used which is approximately thirty-one fortieths or 77.5% of piperonyl butoxide.

Added to the insecticide or vice versa, is a wetting and adhesive agent in the nature of a vegetable oil such as rice oil, olive oil, peanut oil or cottonseed oil. These vegetable oils give to the insecticide the required residual properties necessary to effectuate a 100% insect kill. The optimum effectiveness of the vegetable oil is 2% of the total, but the percentage may vary from 1–5% with satisfactory results. The variation in the amount of vegetable oil and insecticide used is not necessarily proportionate as was necessary with the first three ingredients mentioned. The rice oil and other vegetable oils may vary as the desired and required results dictate. Of the four vegetable oils mentioned, rice oil is the most satisfactory. It enhances to a greater degree the residual properties of the insecticide and is very stable with regard to its resistance to oxidative rancidity.

Admixed with the insecticide and vegetable oil, to result in a finished product, is a highly volatile solvent such as carbon tetrachloride, propylene dichloride and/or ethylene dichloride in an optimum amount of 86%. However, the amount of solvent varies as the other ingredients vary in order to bring the total to 100%. An example of such a preparation would be 1% rice oil, 3.2% piperonyl butoxide, 2.48% kerosene, 0.32% pyrethrins, and 93.00% solvent.

The finished product of insecticide, vegetable oil and solvent is most easily applied by spraying the mixture directly on the rice kernels themselves in such quantity as to have a concentration of insecticide necessary to protect the rice from insect infestation. The concentration of insecticide necessary to effectively control the infestation is 0.0023% by weight, or 10.6 cubic centimeters of sprayed material, having a concentration of 1% rice oil, 3.2% piperonyl butoxide, 2.48% kerosene, 0.32% pyrethrins, and 93.00% solvent, per 100 pounds of rice.

The concentration of insecticide will vary with satisfactory results relative to the amount used as previously defined.

The spraying of the insecticidal material in its finished state results in the insecticide, vegetable oil, and solvent being deposited on the rice or grain kernel. Because of the high volatility of the aforementioned solvents, they evaporate leaving a very fine film of insecticide and vegetable oil. The vegetable oil, because of the adhesive quality inherent therein, also retains the insecticide on the surface of the kernel, but the concentration is not such as will be deleterious to those coming into contact with it and additionally, the concentration before the rice is cooked or further processed, is below the requirements set forth by the Pure Food and Drug Administration as evidenced by the following chart. The chart also shows the concentration of the piperonyl butoxide after the rice has been cooked.

| Sample | Description | Piperonyl Butoxide, p. p. m. | |
|---|---|---|---|
| | | As rec'd | Cooked |
| A1 | Untreated | Nil | |
| A2 | Taken at point of application | 5.7 | 1.2 |
| A3 | Taken after grading and weighing | 4.7 | 0.6 |
| B1 | Taken at point of application | 7.3 | 1.2 |
| B2 | Taken after grading and weighing | 7.2 | 0.5 |

Samples A2 and A3 contained insecticide and solvent.
Samples B1 and B2 contained insecticide, solvent and rice oil.

It is apparent from the above chart that the rice oil adds a residual property to the insecticide which is greatly desired in order to obtain a more effective insect kill, yet when the rice was cooked, the piperonyl butoxide remaining in the rice was no greater or less than in the samples that did not have the rice oil present. Because of this residual property, accomplishment of the second and third methods of elimination of the rice weevil becomes an actual fact. If the egg is not destroyed by the insecticide before the weevil bores its way from the interior of the kernel the residual properties now present in the insecticide, will enable it to kill the rice weevil almost immediately after emergence therefrom.

Some examples of effective residual insecticides are the following:

| | Sample, Percent | | | | |
|---|---|---|---|---|---|
| | 1 | 2 | 3 | 4 | 5 |
| Piperonyl Butoxide | 6.40 | 3.20 | 9.60 | 12.80 | 16.0 |
| Pyrethrins | 0.64 | 0.32 | 0.96 | 1.28 | 1.60 |
| Base Oil | 4.96 | 2.48 | 7.44 | 9.92 | 12.40 |
| Vegetable Oil | 2.00 | 1.00 | 3.00 | 4.00 | 5.00 |
| Solvent | 86.00 | 93.00 | 79.00 | 72.00 | 65.00 |

Manifestly, many advantages emanating from the use of an insecticide having the above described improvements will become apparent to those skilled in the art and many changes and modifications may be made without departing from the spirit of the invention or scope of the appended claims.

Having thus described the invention what is claimed as new and desired to be secured by Letters Patent is:

1. An insecticidal composition of matter for the treatment of grain comprising, in parts by weight of the composition, from 0.32% to 1.6% of pyrethrins in synergistic combination with 3.2% to 16.0% piperonyl butoxide, in a vehicle comprising 2.48% to 12.4% of a deodorized hydrocarbon selected from the group consisting of kerosene and naphtha, 65% to 93% of a volatile solvent selected from the group consisting of carbon tetrachloride, propylene dichloride, and ethylene dichloride, and 1% to 5% of a vegetable oil, selected from the group consisting of rice oil, olive oil, peanut oil, and cottonseed oil.

2. An insecticidal composition of matter for the treatment of grain comprising, in parts by weight of the composition: 0.64% pyrethrins; 6.40% piperonyl butoxide; 4.96% of a deodorized hydrocarbon selected from the group consisting of kerosene and naphtha; 2% of a vegetable oil selected from the group consisting of rice oil, olive oil, peanut oil and cottonseed oil; and the balance being a volatile solvent selected from the group consisting of carbon tetrachloride, propylene dichloride, and ethylene dichloride.

References Cited in the file of this patent

UNITED STATES PATENTS

| | | |
|---|---|---|
| 608,627 | Thiele | Aug. 9, 1898 |
| 2,172,689 | O'Kane | Sept. 12, 1939 |
| 2,309,289 | Zade | Jan. 26, 1943 |

FOREIGN PATENTS

| | | |
|---|---|---|
| 609,467 | Germany | Feb. 15, 1935 |

OTHER REFERENCES

Journal of Eco. Entom. for December 1947, pp. 906 to 909.